No. 822,453. PATENTED JUNE 5, 1906.
W. H. HOLLOPETER.
TRANSMISSION GEAR.
APPLICATION FILED JAN. 26, 1905. RENEWED NOV. 16, 1905.

Witnesses William H. Hollopeter, Inventor.

UNITED STATES PATENT OFFICE.

WILLIAM HAROLD HOLLOPETER, OF FOSTORIA, OHIO.

TRANSMISSION-GEAR.

No. 822,453.  Specification of Letters Patent.  Patented June 5, 1906.

Application filed January 26, 1905. Renewed November 16, 1905. Serial No. 287,729.

*To all whom it may concern:*

Be it known that I, WILLIAM HAROLD HOLLOPETER, a citizen of the United States, residing at Fostoria, in the county of Seneca and State of Ohio, have invented a new and useful Transmission-Gear, of which the following is a specification.

This invention relates to transmission-gearing for securing varying speed or for the reversal of direction of movement, and has for its principal object to provide a compact, strong, and simple gearing of the planetary type in which all of the gears are in constant mesh and in which the number of clutching and other members are less in number than mechanisms now employed for effecting similar results.

A further object of the invention is to construct a speed-changing gearing in which certain of the parts are so constructed as to form an oil-containing casing and insure thorough lubrication of all of the parts.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

Figure 1:
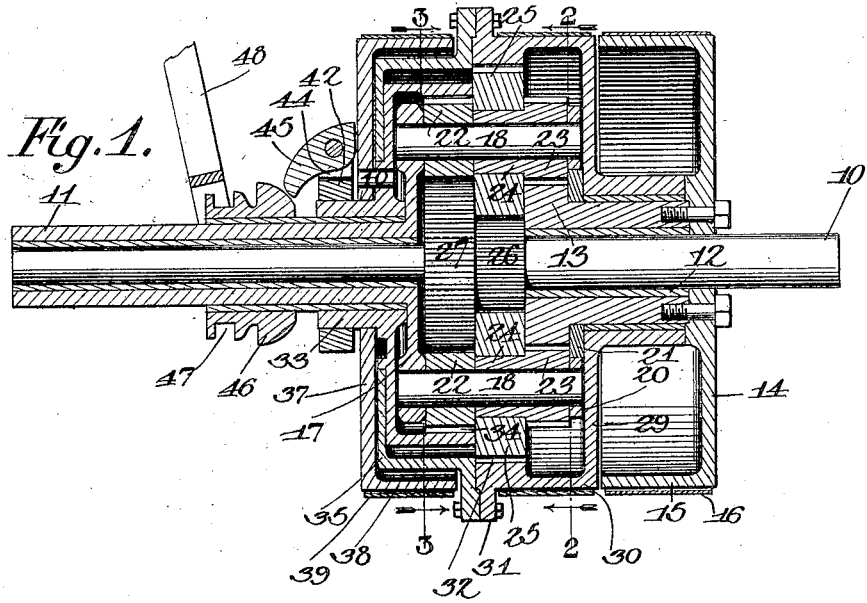
Figures 2, 3:
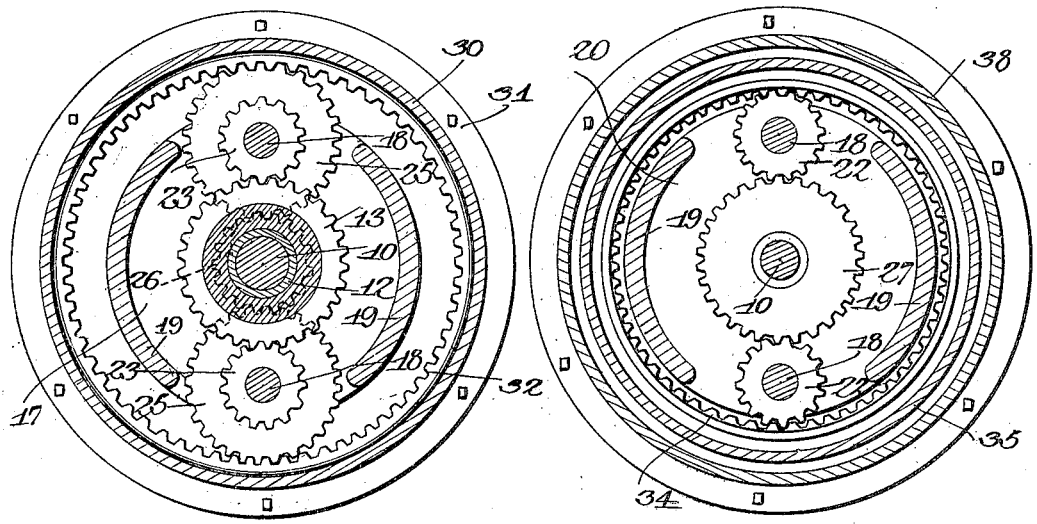

In the accompanying drawings, Figure 1 is a longitudinal sectional elevation of a transmission-gear constructed in accordance with the invention. Fig. 2 is a sectional elevation of the same on the line 2 2 of Fig. 1. Fig. 3 is a similar view on the line 3 3 of Fig. 1.

Similar numerals of reference are employed to indicate corresponding parts throughout the several figures of the drawings.

The main power-shaft 10 is driven by an engine or other means, and the power is transmitted to a hollow shaft 11, which is connected by gearing or otherwise to the mechanism to be operated—as, for instance, the running-gear of an automobile, the propeller of a launch or the like—and with the shaft 10 running at a uniform speed in one direction the shaft 11 may be driven at three different speeds in the same direction and may be reversed.

On the shaft 10 is a bushing 12, carrying a gear 13, that is free to rotate on said shaft and to the extended hub of this gear is secured a disk 14, having an annular flange 15, with which may engage a suitable brake-band 16 or other mechanism for stopping movement of the disk when it is desired to reverse the direction of rotation of the shaft 11.

Secured to or formed integral with the hollow shaft 11 is a disk 17, that is connected by integral webs 19 to a ring 20, that is mounted on a bushing 21, carried by the hub of the gear 13. The disk 17 and ring 20 carry shafts 18, on each of which is loosely mounted a planet-pinion 22 and a similar pinion 23, the latter being provided with an extended hub portion 24, and keyed or otherwise secured on each of these extended hubs is a gear 25.

The shaft 10 carries a pinion 26 and a gear 27, both of which are keyed or otherwise firmly secured to the shafts, and in practice the former will generally have eighteen teeth and the latter thirty-two teeth. The pinion 26 intermeshes with the two gears 25, and the gear 27 intermeshes with the two pinions 22, while the two pinions 23 intermesh with the loose gear 13.

Mounted on the extended hub of the gear 13 or on a bushing surrounding said hub is the hub portion of a housing 29, having a peripheral flange 30 and bolting-flange 31. The flange 30 forms a frictional surface to be engaged by a brake-band or other stopping device when it is desired to lessen the speed of rotation of the driven shaft 11. This housing carries an internal rack 32, that is in constant mesh with the pinions 25.

Mounted loosely on the shaft 11 or on a bushing on said shaft is the hub of a disk 33, having an annular flange that carries or forms a part of an annular rack 34, that is in constant mesh with the two planet-pinions 22. This disk 33 has an annular flange on which loosely turns the ring-like portion 35, which is bolted to the flange 31 of the main housing 30 and rotates therewith.

The hub 33 carries a loose disk 37, having an annular flange 38, that projects over the portion 35 of the housing, said flange constituting a friction-surface with which may engage a brake-band 39 or other suitable mechanism for stopping the rotative movement of the disk 37 when it is desired to rotate the shaft 11 at a speed somewhat less than the normal. The disk 37 and disk 34 are connected for mutual rotative movement by a plurality of pins 40, and at intervals between the pins the disk 34 is provided with small compression-springs which bear against the disk 37 and tend normally to force the same outward from engagement with the disk 35. When pressed inward against and frictionally clutching the disk 35, the gears are so locked that the shaft 11 receives movement in the same direction and at the same speed as the shaft 10.

To accomplish clutching movement of the disk 37, the hub 33 carries a rigid ring or collar 42, having a plurality of sets of pivot-ears 44—generally three in number—and between these sets of pivot-ears are arranged levers 45, the inner ends of which may bear against the outer face of the disk 37. The opposite ends of the levers 45 may be engaged by the conical or rounded face of a sleeve 46, that is feathered to the shaft 11 or a bushing thereon and is free to move longitudinally of said shaft. The sleeve has an annular groove 47 for the reception of pins or rollers projecting inwardly from the bifurcated end of an operating-lever 48.

All of the several friction-band-operating levers and the clutching-lever are arranged within convenient reach of an attendant, as is well understood in mechanism of the class to which the invention relates.

When all of the friction-bands are loose, the rotative movement of the shaft 10 revolves the pinion 26 and gear 27; but the planet-gears will not transmit any movement to the shaft 11 sufficient to overcome the inertia of the shaft and the mechanism to which it is connected. Said shaft will therefore remain stationary.

To move ahead slowly—that is to say, to rotate the shaft 11 in the same direction as the shaft 10, but at a slower speed—the flange 30 of the housing 29 is locked by its friction-band or other mechanism. As a result of this the pinion 26 revolves the planet-gears 25, and as the annular rack 31 is locked said gears 25 will move ahead or follow the rack and in so doing will revolve the disk 17, ring 20, and shaft 11, the movement being in the same direction, but at a much slower rate of speed than that at which the shaft 10 is revolving.

To go ahead at a greater rate of speed, the housing 30 is released, and the brake 39 is applied to the flange 38. This immediately locks the flange 34 and the internal rack carried thereby. Movement now is transmitted from the shaft 10 through gear 27 to the planet-pinions 22, and the internal rack being locked the pinions follow the internal rack and rotative movement is imparted to the disk 17, ring 20, and shaft 11 at a speed about double that previously obtained, but slower than the speed of the shaft 10.

In order to lock the two shafts to each other, the lever 48 is operated and levers 45 are thrown tightly against the disk 37. The latter frictionally engages the disk or ring 35 of the housing and locks the internal racks 31 and 34 from relative movement. Owing to the difference in diameter of the racks and the difference in diameter of the gears which drive them, independent movement of any of the gears will be prevented, and the shaft 11 will be revolved with the shaft 10 as one body.

To reverse the direction of rotation of the shaft 11, the brake-band 16 is applied to the flange 15. This locks the gear-wheel 13 from movement. The pinion 26 now acts through the gears 25 to revolve the pinions 22, and as the latter are in mesh with the lock-gear 13 they are compelled to follow said gear, and the disk 17, ring 20, and shaft 11 will all be revolved in a direction the reverse of that in which the shaft 10 is rotating, but at a much slower rate of speed.

It will be observed that in all cases the gears remain constantly in mesh with each other, so that all danger of injuring the teeth due to movement of the gears into and out of mesh is avoided. The operative parts, however, are all confined within a practically oil-tight housing, so that all of the parts will be thoroughly lubricated and the entrance of dust and dirt prevented.

Having thus described the invention, what is claimed is—

1. In transmission-gearing, a driving-shaft, a pinion and a gear-wheel rigidly secured thereto, a pinion mounted loosely on the shaft, a driven shaft, a plurality of sets of planet-gears carried by said driven shaft, one of said planet-gears being in mesh with the gear, another with the pinion, and a third with the loose gear, normally loose annular racks in constant mesh with two sets of planet-gears, and independent means for locking said annular racks and the loose pinion from independent movement.

2. The combination in transmission-gearing, of a driving-shaft, a driven shaft, a gear and pinion secured rigidly to the driving-shaft, a gear mounted loosely on said driving-shaft, a plurality of sets of planet-gears carried by the driven shaft, and intermeshing, respectively, with the gear, the pinion and the loose gear, a pair of annular racks forming internal gears in constant mesh with two of the sets of planet-gears, and independent means for locking said internal gears and said loose gear from rotative movement.

3. The combination in transmission-gearing, of a driving-shaft, a driven shaft, a gear and pinion keyed to the driving-shaft, a loose gear on said driving-shaft, a plurality of sets of planet-gears carried by the driven shaft and intermeshing, respectively, with the gear, the pinion and loose gear, a housing inclosing the gears and serving as an oil-case, said housing having one portion of its surface arranged to be engaged by a friction-band or other stopping device, an internal gear forming a part of the housing and being in constant mesh with one set of planet-gears, a second internal gear in constant mesh with another set of planet-gears, and means for stopping the rotative movement of said second internal gear, means for stopping rotative movement of the loose pinion, and means for locking the internal gears to each other.

4. The combination in transmission-gearing, of a driving-shaft, a driven shaft, a gear and pinion keyed to the driving-shaft, a loose gear on said driving-shaft, a plurality of sets of planet-gears carried by the driven shaft and intermeshing, respectively, with the fixed gear, the pinion and the loose gear, a pair of internal gears of, respectively, different diameter engaging two of the sets of planet-gears, independent means for locking said internal gears from movement, means for locking the two internal gears to each other, and independent means for locking the loose gear from rotative movement.

5. The combination in a transmission-gearing, of a driving-shaft, a gear and a pinion keyed to said shaft, a loose gear on the driving-shaft, a driven shaft, a plurality of sets of planet-gears carried by the driven shaft and intermeshing, respectively, with the fast gear, the pinion, and the loose gear, a housing inclosing all of the gears and forming an oil-case, an internal gear carried by the housing and intermeshing with one of the sets of planet-gears, means for stopping rotative movement of the housing, a friction-disk secured to the loose gear, means for engaging said friction-disk, and locking the same from rotative movement, a second internal gear arranged within the housing and in constant mesh with one set of planet-gears, means for locking said second internal gear from rotative movement, and an independent means for locking the two internal gears to each other.

6. The combination in a transmission-gearing, of a driving-shaft, a gear-wheel and a pinion keyed thereto, a loose pinion on said shaft, a hollow driven shaft mounted loosely on the driving-shaft, a disk secured to said driven shaft, a ring revoluble with said disk, a bushing carried by the hub of the loose gear, and forming a support for the ring, a pair of shafts connecting the disk and ring for mutual rotative movement, planet-gears carried by the pair of shafts and in constant mesh with the fast gear, an internal gear meshing with said planet-gears and having its hub portion loosely mounted on the driven shaft, a locking-pin projecting from said hub portion, a friction-disk carried by the hub portion and having an opening for the reception of said pin, a spring normally tending to separate the internal gear from the friction-disk, a housing inclosing all of the gears and having a portion extending between the internal gear and the friction-disk, an internal gear forming a part of the housing, planet-gears carried by the pair of shafts and forming a gearing connection between the fixed pinion and the internal gear of the housing, pinions secured to the last-named planet-gears, and intermeshing with the loose gear, means for locking the housing from rotative movement, means for locking the loose gear from rotative movement, a collar carried by the hub of the first internal gear, pivot-ears projecting from said collar, levers arranged between said pivot-ears and having cam-shaped ends for engagement with the friction-disk, and a slidable collar carried by the driven shaft and engaging said levers.

In testimony that I claim the foregoing as my own I have hereto affixed my signature in the presence of two witnesses.

WILLIAM HAROLD HOLLOPETER.

Witnesses:
A. R. WILSON,
C. M. HOLLOPETER.